(12) United States Patent
Baek et al.

(10) Patent No.: US 9,690,981 B2
(45) Date of Patent: Jun. 27, 2017

(54) SYSTEM AND METHOD FOR MOTION EVALUATION

(71) Applicant: ELECTRONICS AND TELECOMMUNICATIONS RESEARCH INSTITUTE, Daejeon (KR)

(72) Inventors: Seong-Min Baek, Daejeon (KR); Myung-Gyu Kim, Daejeon (KR); Ye-Jin Kim, Daejeon (KR); Jong-Sung Kim, Daejeon (KR); Sang-Woo Seo, Daejeon (KR); Il-Kwon Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 24 days.

(21) Appl. No.: 14/975,216

(22) Filed: Dec. 18, 2015

(65) Prior Publication Data

US 2016/0232676 A1 Aug. 11, 2016

(30) Foreign Application Priority Data

Feb. 5, 2015 (KR) ........................ 10-2015-0018189

(51) Int. Cl.
*G06K 9/00* (2006.01)
*G06T 7/246* (2017.01)

(52) U.S. Cl.
CPC .......... *G06K 9/00342* (2013.01); *G06T 7/251* (2017.01); *G06T 2207/10016* (2013.01);
(Continued)

(58) Field of Classification Search
CPC ...... G06K 9/00342; G06T 2207/10016; G06T 2207/30196; G06T 2207/30241; G06T 7/251
(Continued)

(56) References Cited

U.S. PATENT DOCUMENTS 8,253,746 B2 8/2012 Geisner et al.
8,334,842 B2 12/2012 Markovic et al.
(Continued)

FOREIGN PATENT DOCUMENTS

KR 10-2001-0095900 A 11/2001
KR 10-2002-0011851 A 2/2002
(Continued)

OTHER PUBLICATIONS

Seongmin Baek et al, "Dance Experience System Using Multiple Kinects" ICNCC 2014, vol. 4, No. 1, pp. 45-49, Dec. 26, 2014.

*Primary Examiner* — Manuchehr Rahmjoo
(74) *Attorney, Agent, or Firm* — LRK Patent Law Firm

(57) ABSTRACT

A system and a method for motion evaluation. The system for motion evaluation includes: a plurality of sensor apparatuses photographing a user to acquire user's joint data; an analysis apparatus performs calibration and synchronization on the joint data input from the plurality of sensor apparatuses to generate a user's skeleton and uses pose vectors calculated for each body part to compare a user's pose with an expert's pose; and a display apparatus outputting a user character moved depending on a user's motion by using the skeleton, together with an expert character and outputting the comparison result.

18 Claims, 16 Drawing Sheets

(52) U.S. Cl.
CPC ............... *G06T 2207/30196* (2013.01); *G06T 2207/30241* (2013.01)

(58) Field of Classification Search
USPC ........................................................ 382/107
See application file for complete search history.

(56) References Cited

U.S. PATENT DOCUMENTS

| | | |
|---|---|---|
| 8,437,506 B2 | 5/2013 | Williams et al. |
| 2002/0019258 A1 | 2/2002 | Kim et al. |
| 2012/0143358 A1* | 6/2012 | Adams .................... G06F 3/011 700/92 |
| 2012/0206577 A1 | 8/2012 | Guckenberger et al. |
| 2012/0293630 A1 | 11/2012 | Persaud et al. |
| 2014/0188009 A1 | 7/2014 | Lange et al. |
| 2014/0243710 A1 | 8/2014 | Jeong |
| 2014/0286577 A1 | 9/2014 | Suk et al. |

FOREIGN PATENT DOCUMENTS

| | | |
|---|---|---|
| KR | 10-2012-0075858 A | 7/2012 |
| KR | 10-2014-0107062 A | 9/2014 |
| KR | 10-2014-0115784 A | 10/2014 |

\* cited by examiner

Interpolation based on Spline Curve

Time [0] : 2558844630 ... 4
Time [1] : 2558844639 ... 13
Time [2] : 2558844626 ... 0

Time [0] : 2558844698 ... 0
Time [1] : 2558844703 ... 5
Time [2] : 2558844726 ... 28

Time [0] : 2558844934 ... 8
Time [1] : 2558844939 ... 13
Time [2] : 2558844926 ... 0

Time [0] : 2558845098 ... 0
Time [1] : 2558845139 ... 41
Time [2] : 2558845129 ... 31

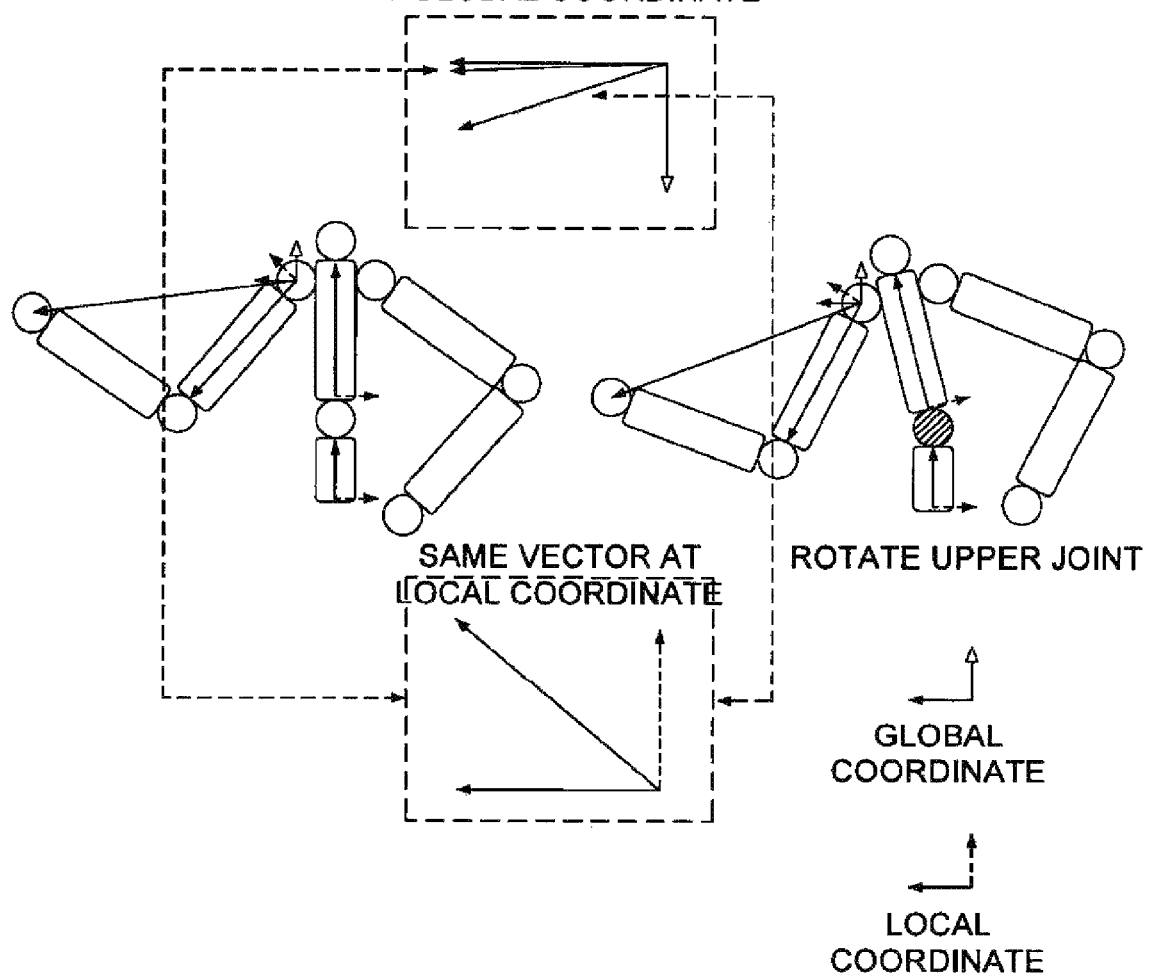

FIG. 12
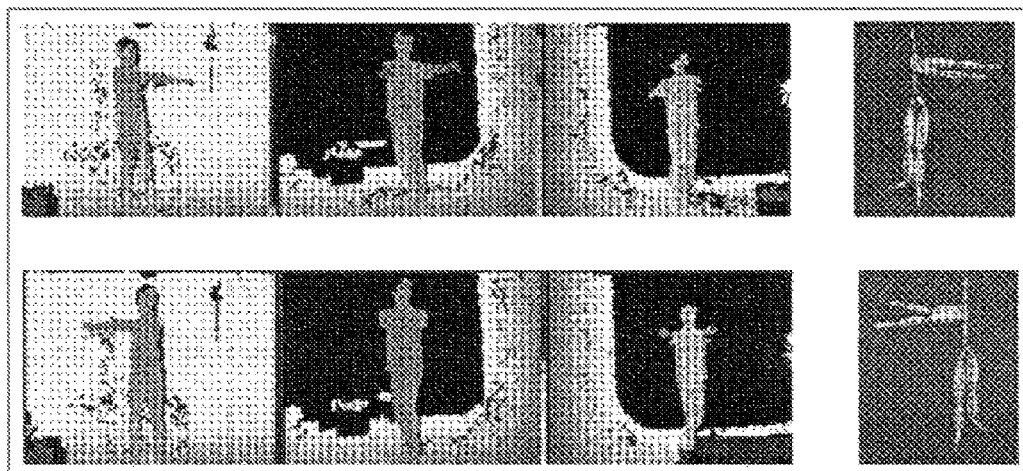
FIG. 13
Skeleton from Single Kinect (front)
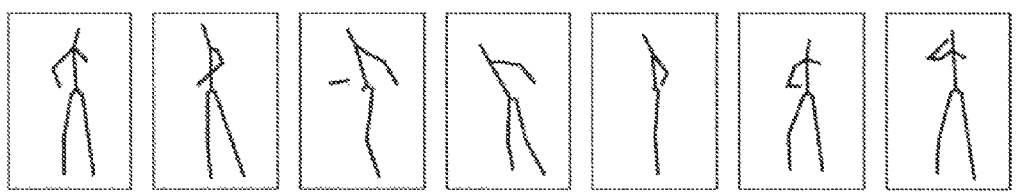
Skeleton from Multiple Kinects
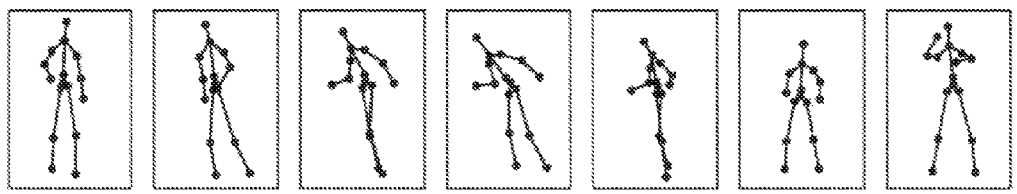

FIG. 15
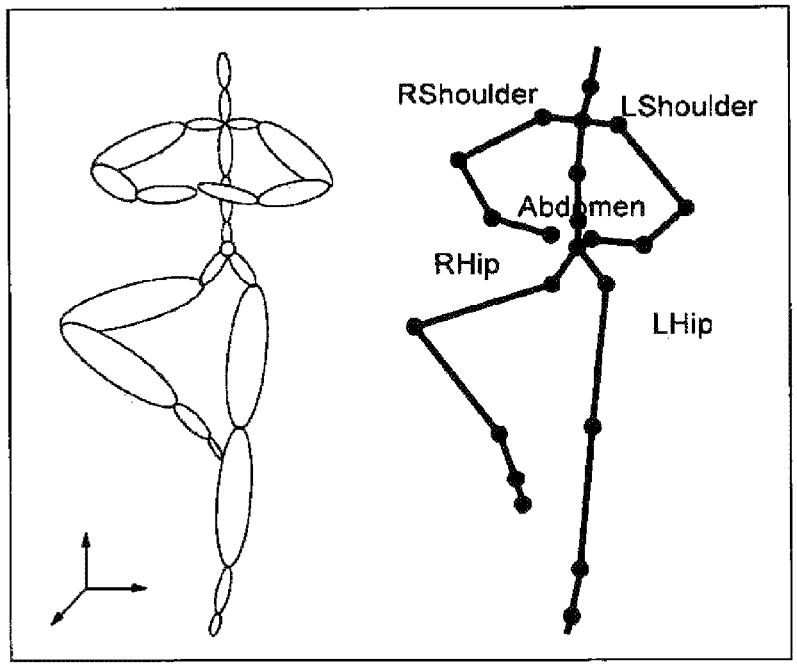
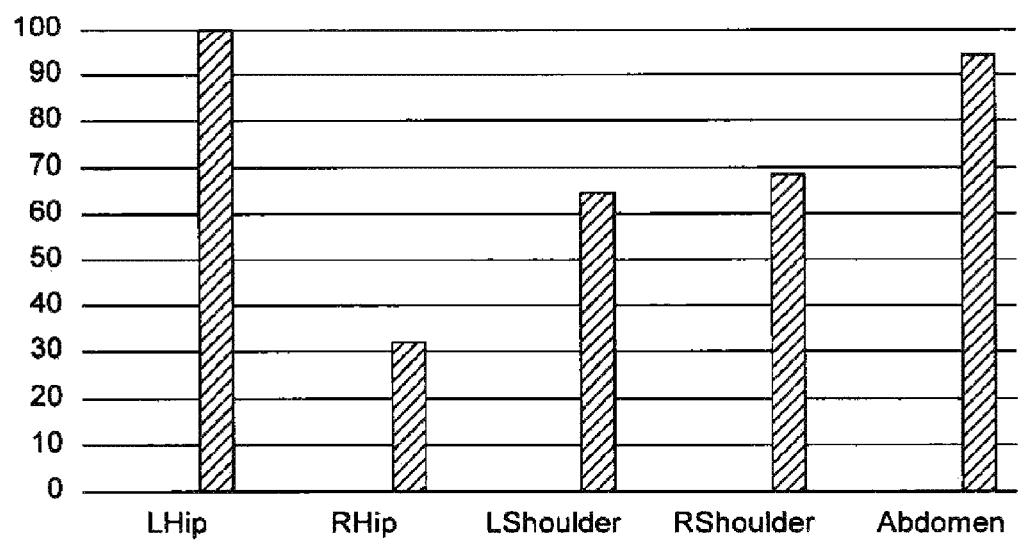

SYSTEM AND METHOD FOR MOTION EVALUATION

CROSS REFERENCE TO RELATED APPLICATION

This application claims the benefit of Korean Patent Application No. 10-2015-0018189, filed on Feb. 5, 2015, entitled "System and Method for Motion Evaluation", which is hereby incorporated by reference in its entirety into this application.

BACKGROUND OF THE INVENTION

1. Technical Field

The present invention relates to a system and a method for motion evaluation.

2. Description of the Related Art

Experience-based game systems which are being currently released use one sensor to analyze and score a user's motion following what an expert does. According to the related art, when the experience-based game systems use one sensor to acquire user's motion data, body parts are covered and thus joint tracking may not be made. As a result, there is a problem in that a user's character may not be visualized on a screen and only some joints may be scored by comparison in some important frames.

Further, when the experience-based game systems use one sensor to acquire the user's motion data, a user's body size and an expert's body size are different from each other, and therefore it is difficult to perform a direct comparison. To solve the above problems, a motion retargeting method among the existing animation technologies may be applied but needs to distort the acquired motion data. Therefore, the acquired motion data may not be considered to be identical with the user's motion.

Therefore, there is a need to solve a joint tracking failure problem due to the covering, etc., occurring in the user's motion data acquired by using one sensor and directly compare the motions between the user and the expert having different body sizes with each other without a motion variation.

SUMMARY OF THE INVENTION

An object of the present invention is to provide a system and a method for motion evaluation capable of acquiring user's motion data in real time by using a plurality of sensors and directly comparing motions of an expert and a user having different body sizes with each other, thereby solving the existing covering problem of body parts occurring in the user's motion data acquired by using one sensor.

According to an aspect of the present invention, there is provided a system for motion evaluation, including: a plurality of sensor apparatuses photographing a user to acquire user's joint data; an analysis apparatus performing calibration and synchronization on the joint data input from the plurality of sensor apparatuses to generate a user's skeleton and using pose vectors calculated for each body part to compare a user's pose with an expert's pose; and a display apparatus outputting a user character moved depending on a user's motion by using the skeleton, together with an expert character and outputting the comparison result.

The analysis apparatus may include: a calibrator setting a coordinate of one of the plurality of sensor apparatuses as a reference coordinate and calculating a coordinate transformation matrix for transforming coordinates of the rest sensor apparatuses into the reference coordinate; a synchronizer recording time for the plurality of sensor apparatuses to start to capture and interpolating the joint data based on the fastest capture time to synchronize the joint data of the plurality of sensor apparatuses; a mixer generating candidate segments depending on the number of joints tracked by the plurality of sensor apparatuses and included in the segment, selecting a segment having a highest tracking weight value from the candidate segments, and mixing the joint data of the selected segment to generate the skeleton for the user's motion; a comparator defining the pose vectors calculated for each body part and using the pose vectors to compare the user's pose and the expert's pose having different body proportions with each other; and a result calculator storing the calibrated and synchronized joint data, outputting the user character, to which the skeleton is applied, through the display apparatus, and generating the comparison results using the pose vectors and displaying the generated comparison results through the display apparatus.

The calibrator may use the coordinate transformation matrix to transform coordinates of the joint data of the rest sensor apparatuses to unify the plurality of joint data into the reference coordinate.

The synchronizer may apply a spline interpolation which is curved lines connecting between control points adjusted depending on a synchronization time for joint position values captured by the plurality of sensor apparatuses at a present time and a previous time to calculate a new joint position value.

The mixer may divide a body into at least one segment among a body, both arms, and both legs, count a tracking frequency of the plurality of sensor apparatuses for each joint, determine segments in which all the included joints are tracked as candidate joints, allocate tracking weight values of each joint to correspond to a tracking frequency, and select a segment having the highest tracking weight values from the candidate segments.

The mixer may select the joint depending on the tracking weight values of each joint when there is no segment in which all the included joints are tracked and form one segment into the selected joint.

The mixer may search for the joint data at a similar position by calculating a joint position region prior to mixing the joint data and mix the searched joint data to solve a problem that the joint data at different part are mixed which is caused when the plurality of sensor apparatuses do not divide a heading direction of the user.

The comparator may calculate the pose vectors at a local coordinate at which even a position displacement of an upper joint does not affect a lower joint.

The comparator may calculate directions and lengths of the pose vectors at the local coordinate and determine a similar motion or a wrong motion based on a difference in the directions and the lengths.

According to another aspect of the present invention, there is provided a method for motion evaluation performed by an analysis apparatus using a plurality of sensor apparatuses, including: receiving user's joint data acquired by photographing a user from the plurality of sensor apparatuses; performing calibration on the plurality of joint data input from the plurality of sensor apparatuses; performing synchronization on the plurality of joint data; generating a user's skeleton by mixing the plurality of joint data into one joint data; outputting a user character moved depending on a user's motion by using the skeleton, together with an expert character; comparing a user's pose with an expert's pose by using pose vectors calculated for each body part; and outputting the comparison result.

In the performing of the calibration, a coordinate of one of the plurality of sensor apparatuses may be set as a reference coordinate and a coordinate transformation matrix for transforming coordinates of the rest sensor apparatuses into the reference coordinate may be calculated.

In the performing of the calibration, the coordinate transformation matrix may be used to transform coordinates of the joint data of the rest sensor apparatuses to unify the plurality of joint data into the reference coordinate.

In the performing of the synchronization, the plurality of sensor apparatuses may record time starting to capture and interpolate the joint data based on the fastest capture time to synchronize the joint data of the plurality of sensor apparatuses.

In the performing of the synchronization, the plurality of sensor apparatuses may apply a spline interpolation which is curved lines connecting between control points adjusted depending on a synchronization time for joint position values captured by the plurality of sensor apparatuses at a present time and a previous time to calculate a new joint position value.

In the generating of the skeleton, the plurality of sensor apparatuses may generate candidate segments depending on the number of joints tracked by the plurality of sensor apparatuses and included in the segment, select a segment having a highest tracking weight value from the candidate segments, and mix the joint data of the selected segment to generate the skeleton for the user's motion.

In the generating of the skeleton, a body may be divided into at least one segment among a body, both arms, and both legs, tracking frequencies of the plurality of sensor apparatuses for each joint may be counted, segments in which all the included joints are tracked may be determined as candidate segments, tracking weight values of each joint may be allocated to correspond to the tracking frequencies, and a segment having the highest tracking weight values may be selected from the candidate segments.

In the generating of the skeleton, when there is no segment in which all the included joints are tracked, the joint may be selected depending on the tracking weight values of each joint and the selected joint may form one segment.

In the generating of the skeleton, the joint data at a similar position may be searched by calculating a joint position region prior to mixing the joint data and the searched joint data may be mixed to solve a problem that the joint data at different part are mixed which is caused when the plurality of sensor apparatuses do not divide a heading direction of the user.

In the comparing of the user's pose with the expert's pose, the pose vectors calculated for each body part may be defined and the pose vectors may be used to compare the user's pose and the expert's pose having different body proportions with each other.

In the comparing of the user's pose with the expert's pose, the pose vectors may be calculated at a local coordinate at which even a position displacement of an upper joint does not affect a lower joint.

BRIEF DESCRIPTION OF THE DRAWINGS

FIG. 10 is a diagram illustrating a pose vector of an arm at a global coordinate and a local coordinate.

FIGS. 12 to 14 are diagrams illustrating a joint data acquisition result.

FIG. 15 is a diagram illustrating an example in which a pose comparison result is displayed.

DESCRIPTION OF EXEMPLARY EMBODIMENTS

Figure 1:
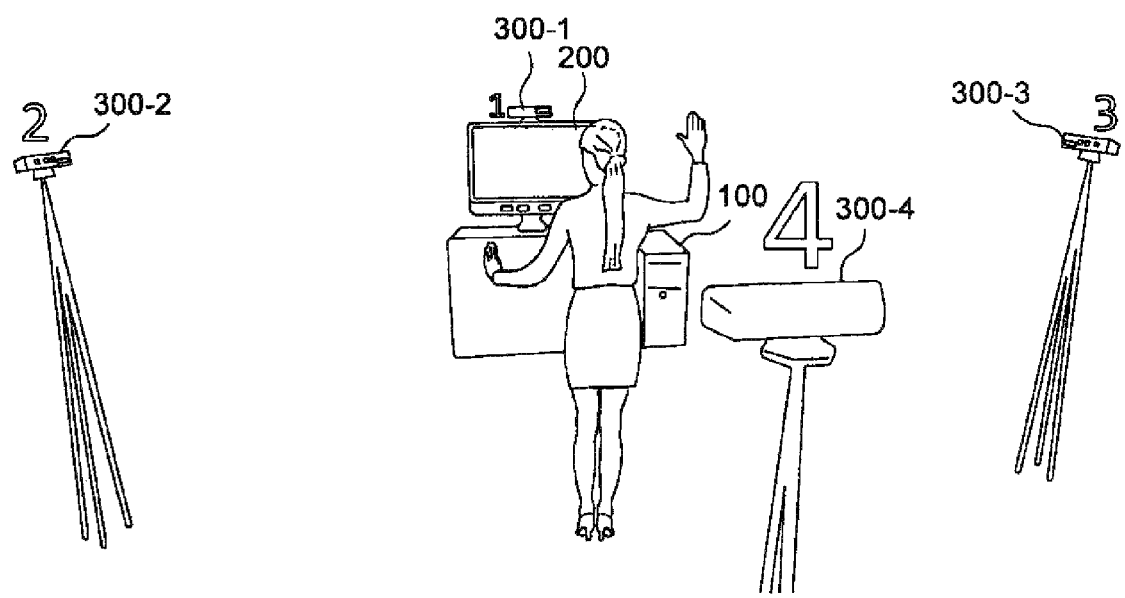
FIG. 1 is a view schematically illustrating a configuration of a system for motion evaluation.

The present invention may be variously modified and have several exemplary embodiments. Therefore, specific exemplary embodiments of the present invention will be illustrated in the accompanying drawings and be described in detail in the present specification. However, it is to be understood that the present invention is not limited to the specific exemplary embodiments, but includes all modifications, equivalents, and substitutions included in the spirit and the scope of the present invention.

Further, when it is determined that the detailed description of the known art related to the present invention may unnecessarily obscure the gist of the present invention, the detailed description thereof will be omitted. Further, numerals (for example, first, second, etc.) used in describing the present specification are only an identification symbol for differentiating one component from other components.

Further, in the present specification, it is to be understood that when one component is referred to as "connected" to another component, one component may be directly connected to another component or may be connected to another component through other component interposed therebetween unless explicitly described to the contrary.

Hereinafter, exemplary embodiments of the present invention will be described in detail with reference to the accompanying drawings. In order to facilitate the entire understanding of the present invention in describing the present invention, the same components will be denoted by the same reference numerals throughout the accompanying drawings.

FIG. 1 is a view schematically illustrating a configuration of a system for motion evaluation.

Referring to FIG. 1, the system for motion evaluation includes an analysis apparatus 100, a display apparatus 200, and a plurality of sensor apparatuses 300. For example, the system for motion evaluation may be configured by connecting a plurality of sensors acquiring motion data to one computer analyzing a user' motion. Here, the sensor may be inexpensive RGB-D sensors such as Microsoft Kinect.

The plurality of sensor apparatuses 300 each photograph a user to acquire user's motion data. For example, as illustrated in FIG. 1, the plurality of sensor apparatuses 300 may be configured of four sensor apparatuses 300-1, 300-2, 300-3, and 300-4 installed at front, rear, left and right sides based on the user to acquire motion data of capturing the user's motion in all directions (360°) and minimizing covering of body parts. Here, each sensor apparatus may include the RGB-D sensor.

The analysis apparatus 100 performs calibration on the plurality of motion data to integrally express coordinates of the plurality of motion data acquired from the plurality of sensor apparatuses 300 and performs synchronization the motion data having a time difference. The inexpensive RGB-D sensors such as the Kinect sequentially perform photographing unconditionally without synchronization and therefore cause a time difference upon the acquisition of the motion data. Therefore, the synchronization of the acquired motion data is required.

Next, the analysis apparatus 100 mixes the plurality of motion data into one motion data to restore a user's 3D pose, thereby generating a skeleton for a user pose. Therefore, the analysis apparatus 100 may use the generated skeleton to output a user character moved depending on the user motion through the display apparatus 200.

Further, the analysis apparatus 100 uses pose vectors calculated for each body part to compare the user's pose with an expert's pose and then output the comparison result through the display apparatus 200. For example, the analysis apparatus 100 may use a graph to output the comparison result and may store a moving picture related to the user character moved depending on the user's motion and the comparison result and then transmit the stored moving picture and comparison result to a user terminal through a network.

The display apparatus 200 displays a screen output from the analysis apparatus 100. For example, the display apparatus 200 may display the user character moved depending on the user's motion or the comparison result of the user's motion with the expert's motion.

Figure 2:
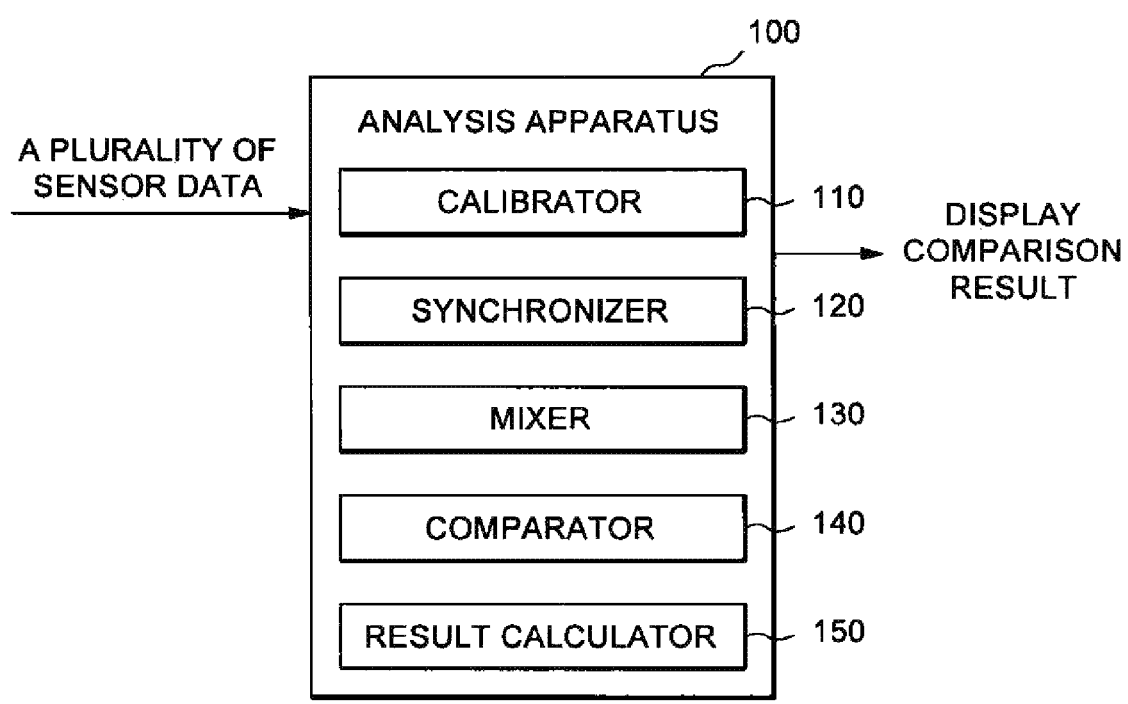
FIG. 2 is a diagram schematically illustrating a configuration of an analysis apparatus of FIG. 1.

FIG. 2 is a diagram schematically illustrating a configuration of the analysis apparatus of FIG. 1.

Referring to FIG. 2, the analysis apparatus 100 includes a calibrator 110, a synchronizer 120, a mixer 130, a comparator 140, and a result calculator 150. The system for motion evaluation uses the plurality of sensor apparatuses 300 and therefore it is important to perform the calibration and the synchronization on the plurality of motion data. Here, the motion data may be joint data including 3D position coordinates of a human joint. Hereinafter, the motion data acquired by the plurality of sensor apparatuses 300 will be described, calling the joint data.

The calibrator 110 sets a coordinate of one of the plurality of sensor apparatuses 300 as a reference coordinate and calculates a coordinate transformation matrix for transforming coordinates of the rest sensor apparatuses into the reference coordinate. Further, the calibrator 110 uses the calculated coordinate transformation matrix to transform coordinates of joint data of the rest sensor apparatuses, thereby unifying the plurality of joint data into the reference coordinate.

For example, to easily implement the calibration of a multi-sensor, a coordinate of the front sensor 300-1 may be set as the reference coordinate and the coordinate transformation matrix for transforming coordinates of the rest sensor apparatuses 300-2, 300-3, and 300-4 into the reference coordinate may be calculated. In this case, the calibrator 110 may directly use the user's joint data to calculate the coordinate transformation matrix.

Figure 3:
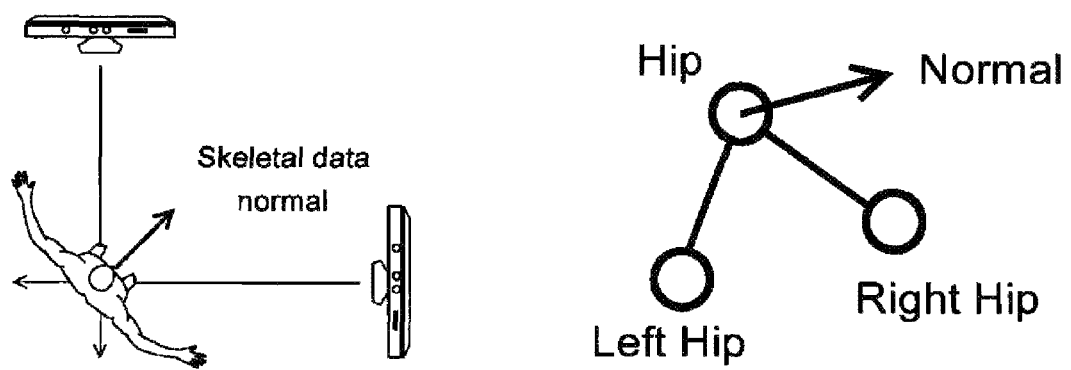
FIG. 3 is a diagram for describing calibration.

That is, FIG. 3 is a diagram for describing the calibration. Referring to FIG. 3, the user stands looking at a direction (for example, 45°) in which the two sensor apparatuses 300 may capture the whole joints. In this state, the calibrator 110 may calculate a direction based on a triangle formed by positions of a Center_Hip_Joint, a Left_Hip_Joint, and a Right_Hip_Joint among joints (for example, 20 joints in the case of the Kinect) having the joint data acquired by each sensor apparatus 300. Further, the directions calculated by each sensor apparatus 300 need to be the same at the reference coordinate and therefore the calibrator 110 may use an angle difference of two normal vectors to calculate a rotation matrix 3×3. Next, the calibrator 110 applies the rotation matrix to all the joint data to make the joint data coincide with each other by the reference coordinate and then calculates a difference between the joint positions of the two sensor apparatuses 300, thereby calculating a moving vector 3×1. In conclusion, the calibrator 110 may calculate the coordinate transformation matrix configured of the rotation matrix and the moving vector. The calibrator 110 may repeat the above process in each of the two sensor apparatuses 300.

Figure 4A:
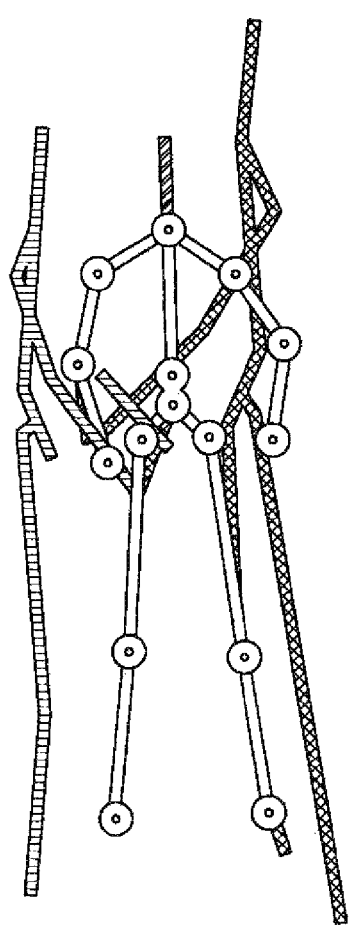
FIGS. 4A and 4B are diagrams illustrating calibration results.
Figure 4B:
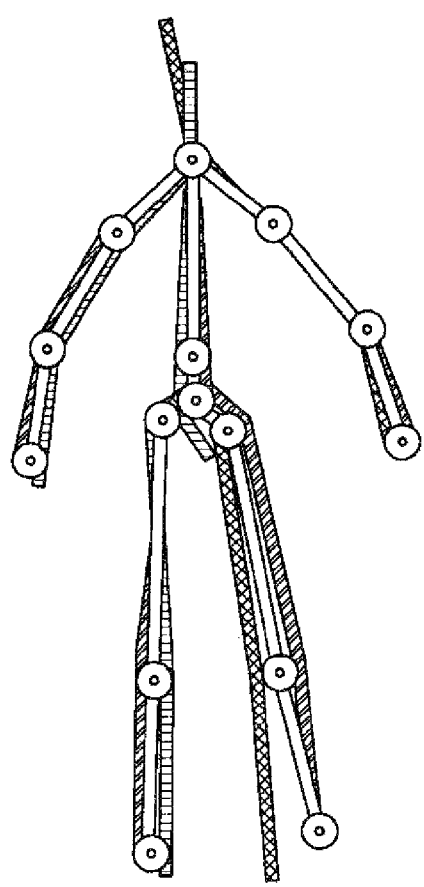

For example, if the coordinate of the front sensor apparatus 300-1 is the reference coordinate, the coordinate transformation matrix for making the coordinates of each of the right and left sensor apparatuses 300-3 and 300-2 coincide with each other by the coordinate of the front sensor apparatus 300-1 may be calculated and the coordinate of the rear sensor apparatus 300-4 may be transformed into the coordinate of the right sensor apparatus 300-3 (or left sensor apparatus (300-2)) and then may coincide with the coordinate of the front sensor apparatus 300-1 using the coordinate transformation matrix from the right sensor apparatus 300-3 (or left sensor apparatus 300-2) into the front sensor apparatus 300-1. The result of the coordinate transformation by the calibration may be illustrated in FIGS. 4A and 4B which are diagrams illustrating calibration results. FIG. 4A illustrates the state before the calibration is performed and FIG. 4B illustrates the state after the calibration is performed.

The synchronizer 120 records time for each sensor apparatus 300 to start to capture and interpolates data based on the fastest capture time to synchronize the joint data of the plurality of sensor apparatuses 300.

Figure 5:
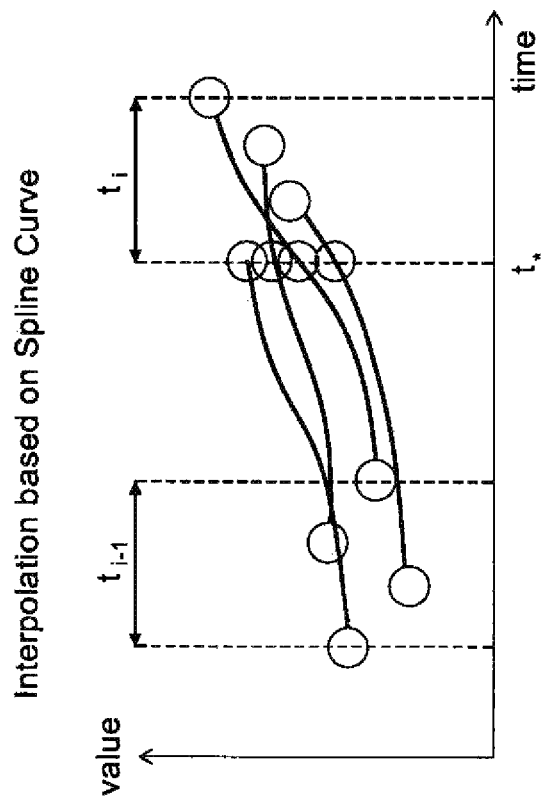
FIG. 5 is a diagram for describing data synchronization.

For example, referring to FIG. 5, FIG. 5 is a diagram for describing data synchronization. That is, a left portion of FIG. 5 illustrates a sensor apparatus number for three sensor apparatuses 300, a capture time (ms), and a capture time difference (ms) between the sensor apparatuses. Since the plurality of sensor apparatuses 300 connected to one analysis apparatus 100 sequentially capture the joint data, the time captured by the first sensor apparatus 300 and the time captured by the final sensor apparatus 300 have the capture time difference of tens of milliseconds (ms). When the joint is rapidly moved, the joint positions acquired by each sensor apparatus 300 may have the difference due to the time difference. The Microsoft Kinect sensor does not support the synchronization and the existing research about a technology for motion evaluation using the multi-sensor also has insufficient synchronization. To easily implement the synchronization, the exemplary embodiment of the present invention supports the synchronization in software, not hardware.

For example, referring to the right graph of FIG. 5, the synchronizer 120 may apply a spline interpolation which is curved lines connecting between control points adjusted depending on a synchronization time $t_*$ for joint position values captured by each sensor apparatus 300 at a present time ti and a previous time $t_{i-1}$ to calculate a new joint position value. The synchronization time may be the fastest capture time and as the spline interpolation method, a Ferguson curve may be used. The Equation of the Ferguson curve may be represented by the following Equation 1.

$$P(t_*)=(1-3t_*^2+2t_*^3)P(0)+(3t_*^2-2t_*^3)P(1)+(t_*-2t_*^2+t_*^3)P'(0)+(-t_*^2+t_*^3)P'(1) \quad (t_{i-1}<_*\leq t_i)$$

[Equation 1]

The Ferguson curve may be configured of positions P(0) and P(1) of joints and joint moving speeds P'(0) and P'(1) and therefore may be used as a useful interpolation method in a character animation. As described above, using the calibration and the synchronization method, the joint position data may be more accurately calculated.

The mixer 130 generates candidate segments depending on the number of joints tracked by each of the plurality of sensor apparatuses 300 and included in the segment, selects a segment having a highest tracking weight value from the generated candidate segments, and mixes the joint data of the selected segment to generate the skeleton for the user's motion.

Figure 6:
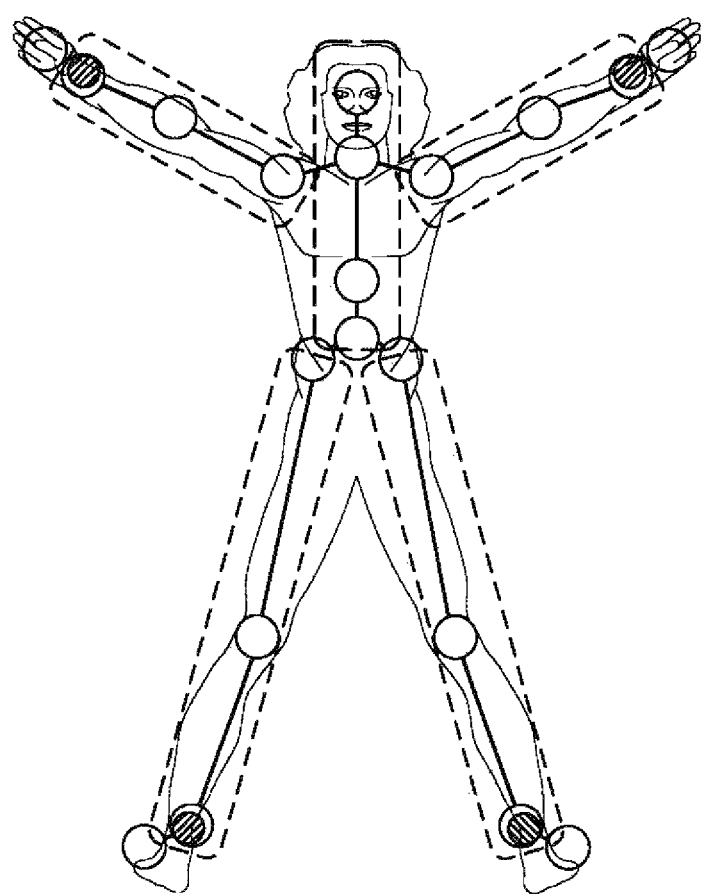
FIG. 6 is a diagram illustrating joint data included in a segment.

For example, to mix the joint data input from the plurality of sensor apparatuses 300 into one joint data, as illustrated in FIG. 6, the whole body may be divided into five segments. FIG. 6 is a diagram illustrating the joint data included in the segment. That is, five segments may be a body, both arms, and both legs. Of course, a method for tracking joints one by one may be possible, but a method for dividing a body into a segment may acquire joint data having low noise.

For example, the mixer 130 may count the tracking frequencies for each joint by each sensor apparatus 300 and determine segments in which all the included joints are tracked as candidate segments. Further, the mixer 130 may allocate tracking weight values for each joint to correspond to the tracking frequencies and select a segment having the highest tracking weight value from the candidate segments. The tracking weight value may be increased by 1 if the tracking is made and may be set to be 0 if the tracking is not made and may be limited to a maximum value set by the user.

When there is no segment in which all the included joints are tracked by the sensor apparatus 300, the mixer 130 may select joints depending on the tracking weight values for each joint and form one segment by the selected joint. For example, an arm segment may consist of a shoulder joint, an elbow joint, and a wrist joint, and when all the three joints of the arm segment are not tracked, the mixer 130 may select the joint having the highest tracking weight value to form one segment.

Further, as a user heads for a direction in which he/she looks at the sensor apparatus 300, the joint tracking is accurate, and therefore when the tracking weight values of the segment are the same, the candidate segment may be defined according to the heading direction of the user. For example, the user stands to head for the front sensor apparatus 300-1 at an early stage, which becomes a-Z direction at the reference coordinate. When the user rotates, the direction vector of the joint may be calculated to calculate in which direction the user rotates every frame.

Figure 7:
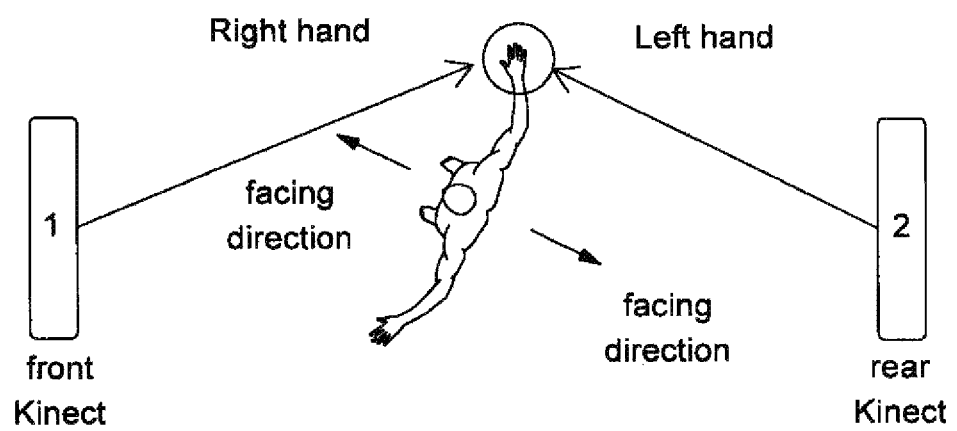
FIG. 7 is a diagram illustrating joint positions tracked by front and rear sensor apparatuses.

The inexpensive sensor apparatus 300 such as the Kinect tracks the joints under the assumption that the user stands in a direction which he/she always looks at the sensor apparatus 300 and therefore may not discriminate whether he/she actually heads for the front or heads for the rear. For example, for the user standing heading for the front sensor apparatus 300-1, the rear sensor apparatus 300-4 is assumed that the user looks at the rear. Since each sensor apparatus 300 is assumed that the user looks at him/her, as illustrated in FIG. 7, a joint position tracked as a right hand joint in the front sensor apparatus 300-1 appears as a left hand joint in the rear sensor apparatus 300-4. FIG. 7 is a diagram illustrating the joint positions tracked by the front and rear sensor apparatuses. When the joint data are mixed as they are, a very abnormal motion appears. To solve the above problem, before the joint data are mixed, the mixer 130 may calculate the joint position region to search for joint data at a similar position and mix the searched joint data.

Figure 8:
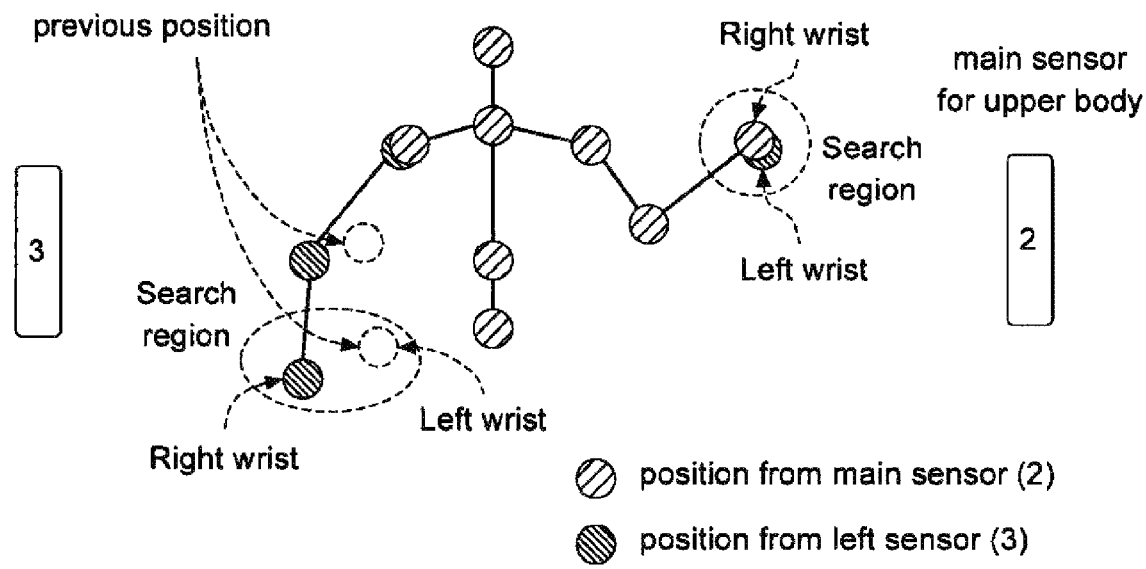
FIG. 8 is a diagram illustrating a search of a reference model based joint position region.

Referring to FIG. 8, FIG. 8 is a diagram illustrating a search of a reference model based joint position region. Searching the joint position region means that a region at a position closest to a joint position of a reference model generated from a main sensor becomes the joint data of the same joint. As illustrated in FIG. 8, the mixer 130 compares a distance between right joints and a distance between left joints in each search region with each other based on the reference model and selects joints at a closer distance to mix the joint data. In this case, when the joint of the reference model is not tracked, the joint position may be predicted based on a position of an upper joint or a position of a previous joint.

The comparator 140 defines the pose vectors calculated for each body part to compare the motions and uses the defined pose vectors to compare the user's pose and the expert's pose having different body proportion with each other.

For example, when comparing poses of characters having the same joint structure, size, and proportion, an inter-pose comparison may be easily made by comparing joint positions, speeds, etc. However, the system for motion evaluation compares the expert's pose with the user's pose. In this case, the expert and the user have the same joint structure but body sizes and proportions of the expert and the user are different, and therefore the comparison of the joint positions, the speeds, etc., is of no significance. Therefore, when two characters have different body sizes and proportions, a solution for the pose comparison between the two characters is required. Generally, a motion retargeting technique is applied to the characters having different sizes in the character animation to solve the above problem. Researches for the motion retargeting technique have been considerably progressed, but when the retargeting method for the pose comparison is used, a motion varies depending on the body size and proportion and therefore the problem that a pose different from an original pose may be generated may be caused. Therefore, the present invention proposes a method for comparing poses between characters having different body sizes and proportions.

Figure 9:
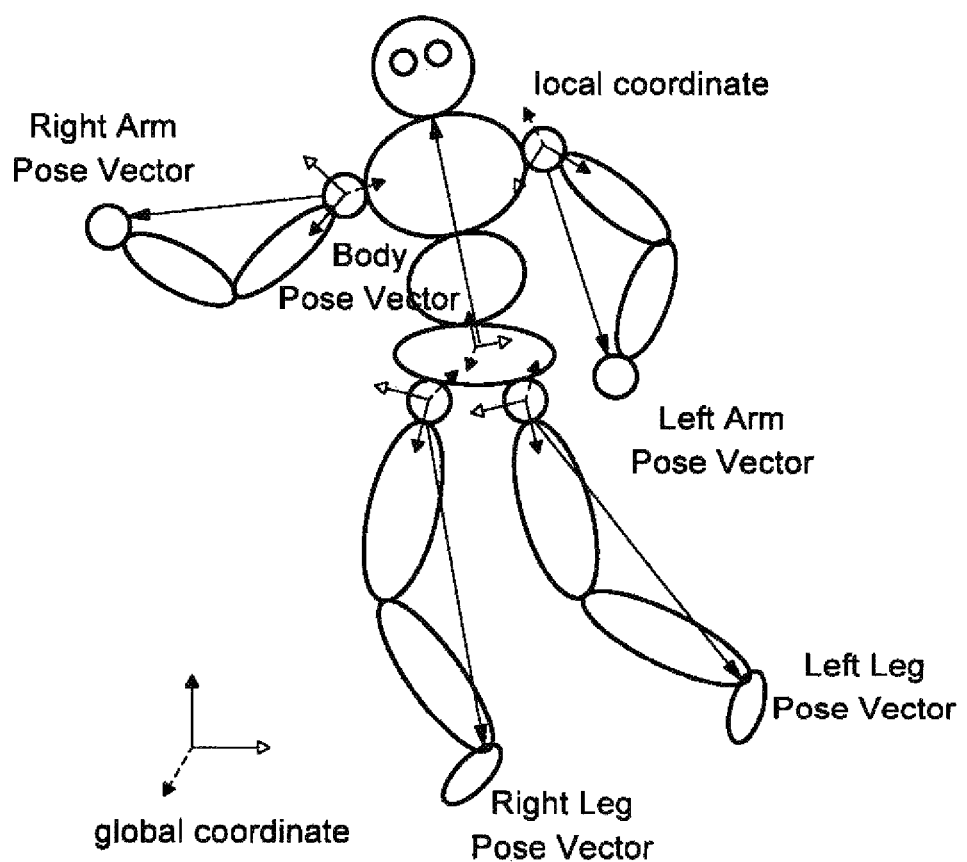
FIG. 9 is a diagram illustrating a pose vector defined for pose comparison.

That is, FIG. 9 is a diagram illustrating the pose vectors defined for the pose comparison. Referring to FIG. 9, the pose vector may be expressed by five vectors of a body, left and right arms, and left and right legs and may consist of vectors connecting each hip center joint to a neck joint, each shoulder joint to each wrist joint, and each left and right hip joint to each ankle joint. When the body sizes of the two characters of which the poses are compared with each other are different from each other, the comparison of the joint positions is of no significance and in the case of comparing the joint angles, when the body proportions are different from each other, the poses vary even in the same angle. However, when the poses are compared with each other by using the defined pose vectors, the problem due to the body size and proportion may be solved. In this case, the pose vectors are not calculated at the global coordinate but are calculated at the local coordinate. Unlike the global coordinate, the local coordinate has an advantage in that the position displacement of the upper joint does not affect the lower joint. For example, FIG. 10 is a diagram illustrating a pose vector of an arm at the global coordinate and the local coordinate. Referring to FIG. 10, if it is assumed that even though the user and the expert take the same pose, a waist joint is a little more inclined to the left, a pose difference occurs in all joints of the upper body upon the use of the global coordinate. However, upon the use of the local coordinate, the result that only a waist part takes a wrong pose and an arm part takes a correct pose may be acquired. This shows that the same effect that only the wrong part is indicated in an actual pose map. Further, for the case in which the joint rotates based on the pose vector, for example, for even the case in which the shoulder joint rotates, the shoulder joint rotates is expressed as the same vector in the global coordinate but is expressed as different vectors in the local coordinate, such that it may be discriminated.

The comparator 140 may calculate the directions and the lengths of the pose vectors in the local coordinate and may determine a similar motion or a wrong motion based on the difference in the directions and the lengths. As the directions and the lengths of the pose vectors are similar to each other, the pose vectors have a similar motion. The body sizes and proportions of two characters to be compared are different from each other and therefore upon the comparison, the length of the pose vector may be calculated as a relative length to the body size.

For example, the comparison result using the pose vector may be calculated using the following Equation 2.

$$V_{m_i} = \frac{(J_{m_i} - J_{m_k})}{|J_{m_i}| + |J_{m_k}|}, V_{u_i} = \frac{(J_{u_i} - J_{u_k})}{|J_{u_i}| + |J_{u_k}|}$$ [Equation 2]

$$C_{a_i} = \text{Norm}_a(V_{m_i} \cdot V_{u_i})$$

$$C_{l_i} = \text{Norm}_l(V_{m_i} - V_{u_i})$$

$$\text{Score} = \sum_{i=0}^{n} (C_{a_i} + C_{l_i})$$

In the above Equation 2, Vmi represents the expert's pose vector (i-th), Vui represents the user's pose vector (i-th), Cai represents a vector angle comparison value, Cli represents a vector length comparison value, and Score represents a final pose comparison result value.

Figure 11A:
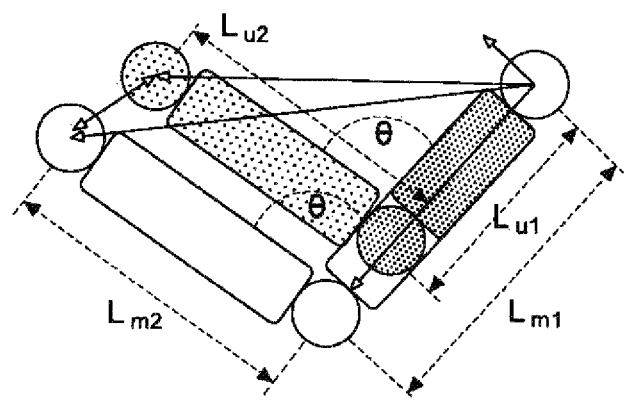
FIGS. 11A to 11C are diagrams illustrating an example of a method for arm's motion coincidence.
Figure 11B:
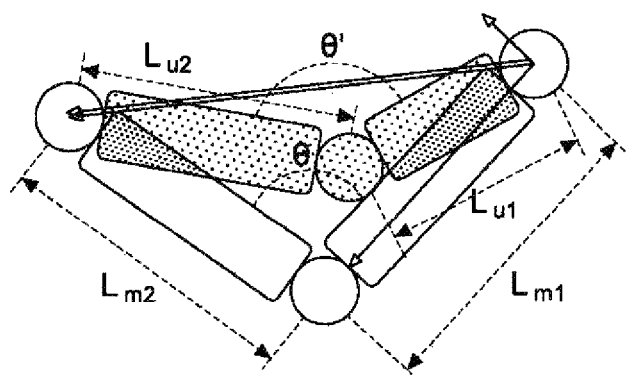
Figure 11C:
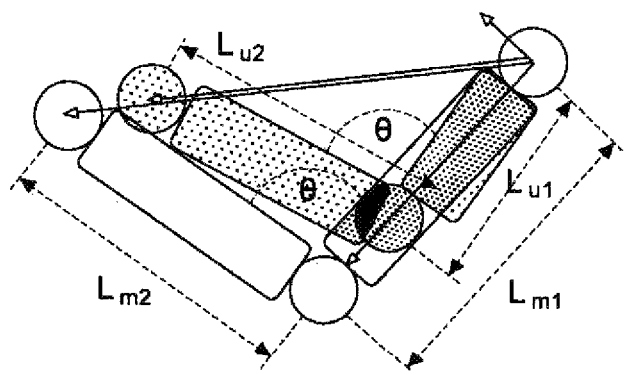

FIGS. 11A to 11C are diagrams illustrating an example of a method for arm's motion coincidence. Referring to FIGS. 11A to 11C, if it is assumed that the pose vector of the above Equation 2 is the arm's pose vector, a ratio of an arm's pose vector V to the whole arm length |Lu1|+|Lu2| may be set as the vector length. Further, as illustrated in FIGS. 11A to 11C, when the angle values coincide with each other (FIG. 11A) or when the angle values coincide with each other by an inverse kinematics technique (FIG. 11B), the user's pose and the expert's pose may not be similar to each other and only when the user takes a pose in the direction in which the pose vectors coincide with each other as illustrated in FIG. 11C, the user's pose may be similar to the expert's pose.

The pose vector is defined based on the local coordinate proposed by the present invention and the comparison method is appropriate for, in particular, a motion of which the pose is important like a dance and may easily be implemented and perform the comparison independent of the body size. Knowing the comparison result value between the respective pose vectors, the user may easily appreciate which part is most wrong at any time, and therefore may perform the motion training.

The result calculator 150 stores the calibrated and synchronized joint data, outputs the user character, to which the generated skeleton is applied, through the display apparatus 200, and generates the comparison results using the pose vectors and displays the generated comparison results through the display apparatus 200.

Figure 14:
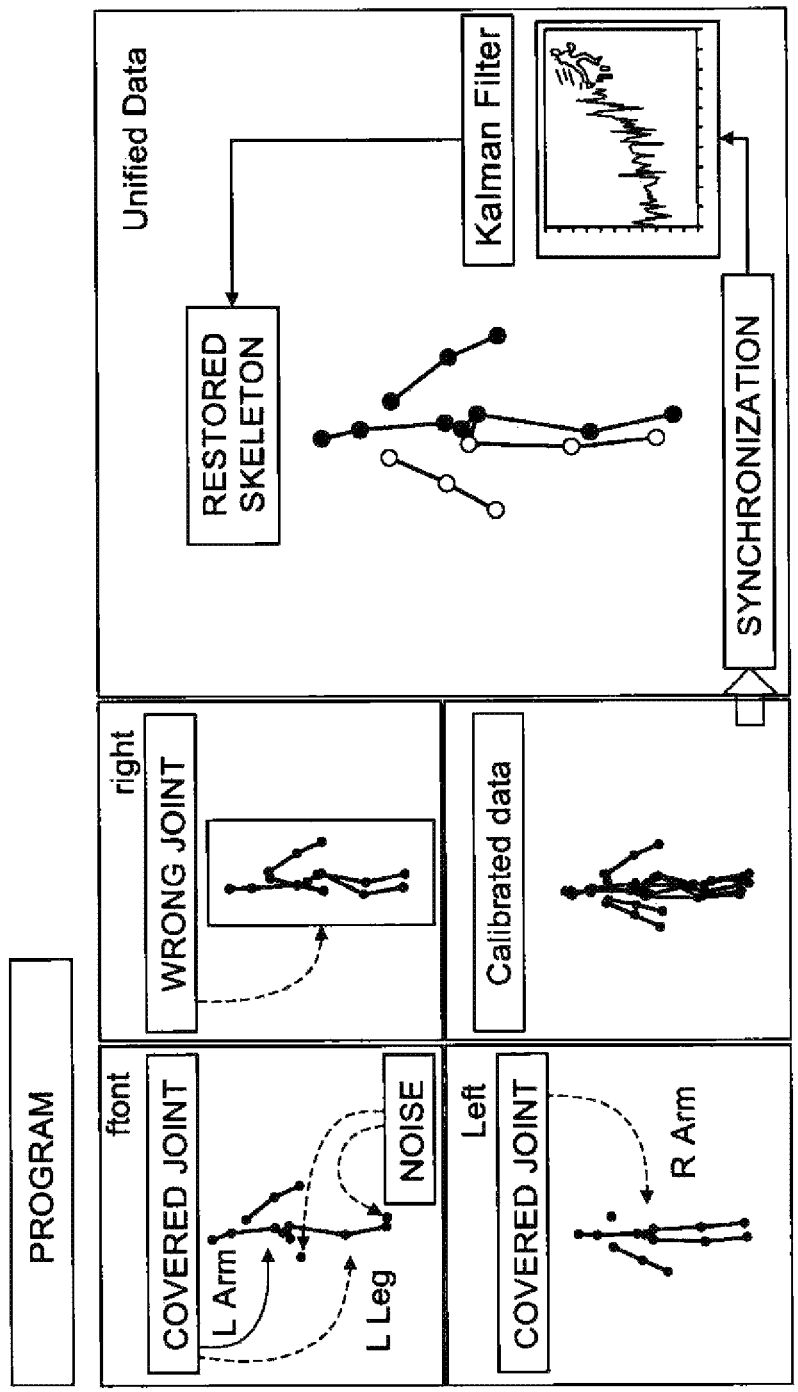

For example, FIGS. 12 to 14 are diagrams illustrating a joint data acquisition result. A pose restoring result by the joint tracking is illustrated at the right of FIG. 12 by using a depth map image of the left of FIG. 12, FIG. 13 illustrates joint data acquired by using one Kinect and a plurality of Kinect, and FIG. 14 illustrates a skeleton restored by using the joint data acquired in each sensor apparatus.

As illustrated in FIG. 13, one Kinect often may not track the joint position as some of the body is covered and thus does not express body parts. On the other hand, when the multi-Kinect is used, it may be appreciated that the capture performance of the user's motion is greatly improved. That is, a success rate of the joint tracking in each Kinect and a success rate of the joint tracking in the multi-Kinect while the user's motion is captured may be calculated as the following Table 1. The following Table 1 shows the success rate of the joint tracking measured in 3000 frames.

TABLE 1

| Joints | Front | Right | Left | Unified |
| --- | --- | --- | --- | --- |
| L Elbow | 82.0% | 74.6% | 83.4% | 99.2% |
| L Wrist | 85.7% | 74.8% | 88.4% | 99.1% |
| R Elbow | 81.4% | 83.8% | 68.3% | 99.1% |
| R Wrist | 85.8% | 83.7% | 70.6% | 98.8% |
| L Knee | 94.7% | 87.8% | 86.5% | 99.7% |
| L Ankle | 84.3% | 78.9% | 88.2% | 99.4% |
| R Knee | 93.6% | 83.6% | 88.3% | 99.9% |
| R Ankle | 80.5% | 67.9% | 86.7% | 99.1% |
| Average | 86.0% | 70.0% | 82.6% | 99.3% |

Referring to the above Table 1, it may be appreciated that when one sensor apparatus is used, the success rate of the joint tracking is about 80% at the utmost, while when the multi-sensor apparatus is used, it is shown that the success rate of the joint tracking rises to 99.3% on average. This means that another sensor apparatus tracks a joint not tracked by one sensor apparatus to restore the joint and therefore a pose may be more accurately restored.

FIG. 15 is a diagram illustrating an example in which the pose comparison result is displayed. Referring to FIG. 15, to comparing the similar poses of the expert and the user having different body sizes, two characters may be displayed based on a skeleton. Parts to be compared are five of a body, left and right arms, and left and right legs. Here, similarity of the poses by the comparison of the pose vectors of the five parts may be expressed by a graph. The user may easily appreciate whether poses of any part are similar from the graph and therefore easily learn a dance.

Figure 16:
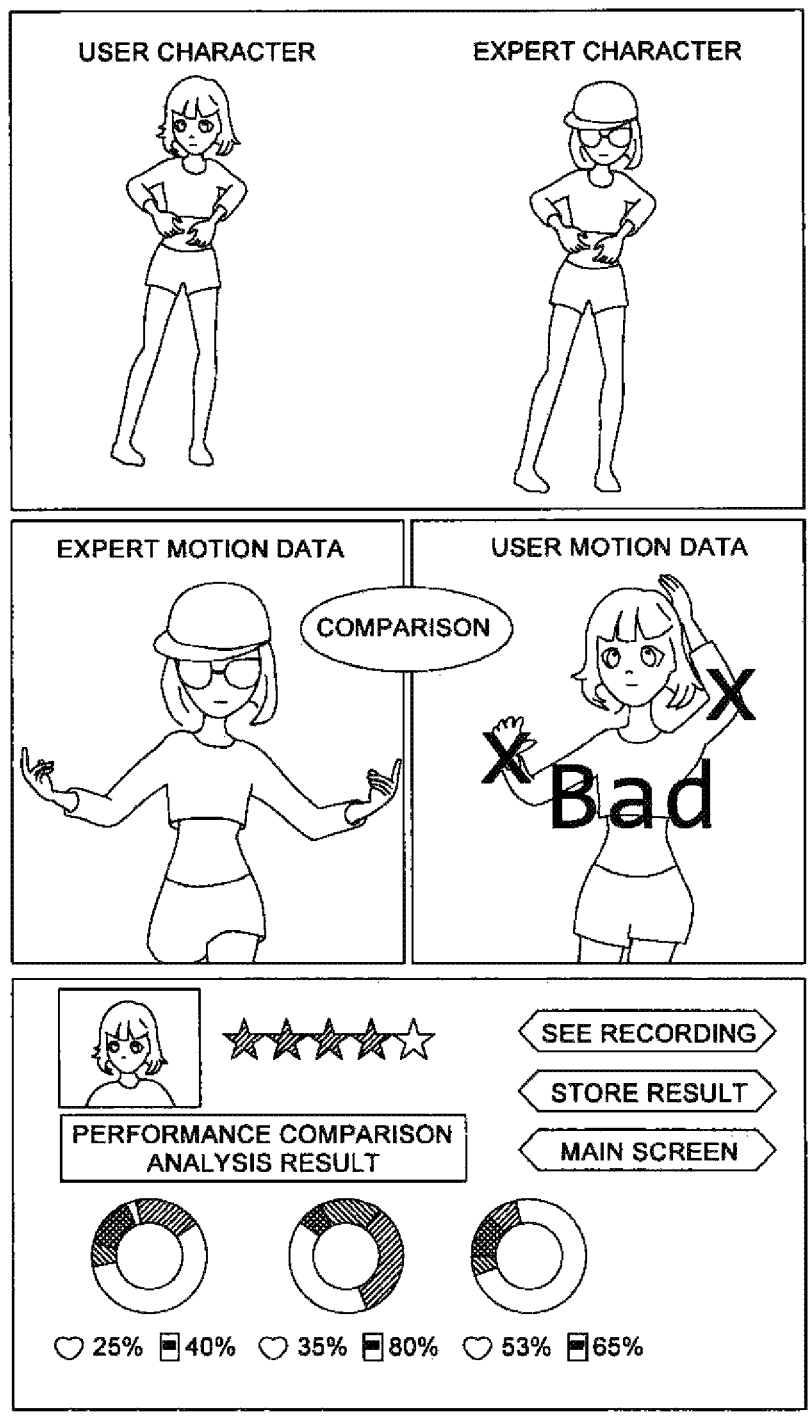
FIG. 16 is a diagram illustrating an example of implementing an experience-based game using the system for motion evaluation.

FIG. 16 is a diagram illustrating an example of implementing an experience-based game using the system for motion evaluation.

Referring to FIG. 16, one or more sensor apparatus 300 may be used and when two or more sensor apparatus 300 is installed, the number of covered joint is reduced and thus the user's joints may be tracked well. When the user follows an expert character looking at the expert character displayed on the screen in the state in which he/she wears a special costume or does not have a marker, most of the user's joints are tracked by the plurality of sensor apparatuses 300 and thus the joint data are acquired, such that the user's skeleton may be restored by the acquired joint data. Therefore, the user's motion may be displayed on one surface together with the expert's motion, and therefore the user may learn the expert's motion looking at his/her motion. The comparison result appears to the user in a moving picture and a result graph for the expert's motion and user's motion and the user may receive the comparison result through mobile devices, etc.

Figure 17:
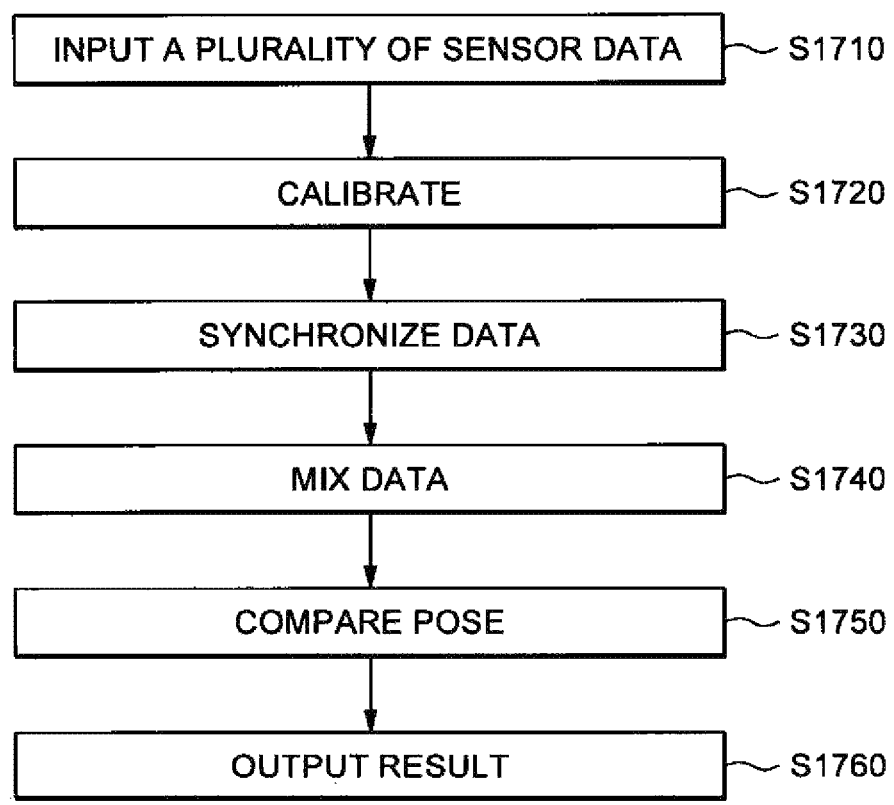
FIG. 17 is a flow chart illustrating a method for motion evaluation in the analysis apparatus of FIG. 2.

FIG. 17 is a flow chart illustrating a method for motion evaluation in the analysis apparatus of FIG. 2.

In step S1710, the analysis apparatus 100 receives the joint data from the plurality of sensor apparatuses 300.

In step S1720, the analysis apparatus 100 performs the calibration on the plurality of joint data to integrally express the coordinates of the plurality of joint data acquired from the plurality of sensor apparatuses 300.

In step S1730, the analysis apparatus 100 performs the synchronization on the plurality of calibrated joint data.

In step S1740, the analysis apparatus 100 mixes the plurality of motion data into one motion data to restore a user's 3D pose, thereby generating the skeleton for the user pose. Further, the analysis apparatus 100 may use the generated skeleton to output the user character moved depending on the user motion through the display apparatus 200.

In step S1750, the analysis apparatus 100 uses the pose vectors calculated for each body part to compare the user's pose with the expert's pose.

In step S1760, the analysis apparatus 100 outputs the comparison result through the display apparatus 200. For example, the analysis apparatus 100 may use a graph to output the comparison result and may store a moving picture related to the user character moved depending on the user's motion and the comparison result and then transmit the stored moving picture and comparison result to a user terminal through a network.

Meanwhile, the method for motion evaluation according to the exemplary embodiment of the present invention may be implemented in a program command form which may be executed by various means for electronically processing information and may be recorded in a storage medium. The storage medium may include a program command, a data file, a data structure, etc., alone or a combination thereof.

The program commands recorded in the storage medium may be especially designed and constituted for the present invention or be known to those skilled in a field of software. Examples of the storage medium may include a magnetic medium such as a hard disk, a floppy disk, and a magnetic tape; an optical recording medium such as a CD-ROM, a DVD; a magneto-optical medium such as a floptical disk; and a hardware device specially constituted to store and perform program commands such as a ROM, a RAM, a flash memory, or the like. Further the above-mentioned medium may also be a transmission medium such as light including a carrier transmitting a signal specifying a program command, a data structure, or the like, a metal line, a waveguide, or the like. Examples of the program commands may include a high-level language code capable of being executed by an electronically information processing apparatus, for example, a computer using an interpreter, or the like, as well as a machine language code made by a compiler.

The above-mentioned hardware device may be constituted to be operated as at least one software module in order to perform an operation according to the present invention, and vice versa.

As described above, according to the exemplary embodiments of the present invention, it is possible to acquire the user's motion data in real time by using the plurality of sensors and directly compare the motions of the expert and the user having different body sizes with each other, thereby solving the existing covering problem of body parts occurring in the user's motion data acquired by using one sensor.

Further, according to the exemplary embodiments of the present invention, the user may confirm his/her own motion and confirm the comparison result from the expert's pose by simultaneously playing the expert's motion and the user's motion, such that the user may learn the motions of dance, sports, etc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A system for motion evaluation, comprising:
a plurality of sensor apparatuses photographing a user to acquire user's joint data;
an analysis apparatus performing calibration and synchronization on the joint data input from the plurality of sensor apparatuses to generate a user's skeleton and using pose vectors calculated for each body part to compare a user's pose with an expert's pose; and
a display apparatus outputting a user character moved depending on a user's motion by using the skeleton, together with an expert character and outputting the comparison result,
wherein the analysis apparatus includes:
a calibrator setting a coordinate of one of the plurality of sensor apparatuses as a reference coordinate and calculating a coordinate transformation matrix for transforming coordinates of the rest sensor apparatuses into the reference coordinate;
a synchronizer recording time for the plurality of sensor apparatuses to start to capture and interpolating the joint data based on the fastest capture time to synchronize the joint data of the plurality of sensor apparatuses;
a mixer generating candidate segments depending on the number of joints tracked by the plurality of sensor apparatuses and included in a segment, selecting a segment having a highest tracking weight value from the candidate segments, and mixing the joint data of the selected segment to generate the skeleton for the user's motion;
a comparator defining the pose vectors calculated for each body part and using the pose vectors to compare the user's pose and the expert's pose having different body proportions with each other; and
a result calculator storing the calibrated and synchronized joint data, outputting the user character, to which the skeleton is applied, through the display apparatus, and generating the comparison results using the pose vectors and displaying the generated comparison results through the display apparatus.

2. The system of claim 1, wherein the calibrator uses the coordinate transformation matrix to transform coordinates of the joint data of the rest sensor apparatuses to unify a plurality of joint data into the reference coordinate.

3. The system of claim 1, wherein the synchronizer applies a spline interpolation which is curved lines connecting between control points adjusted depending on a synchronization time for joint position values captured by the plurality of sensor apparatuses at a present time and a previous time to calculate a new joint position value.

4. The system of claim 1, wherein the mixer divides a body into at least one segment among a body, both arms, and both legs, counts tracking frequencies of the plurality of sensor apparatuses for each joint, determines segments in which all the included joints are tracked as candidate joints, allocates tracking weight values of each joint to correspond to the tracking frequencies, and selects a segment having the highest tracking weight values from the candidate segments.

5. The system of claim 4, wherein the mixer selects the joint depending on the tracking weight values of each joint when there is no segment in which all the included joints are tracked and forms one segment by the selected joint.

6. The system of claim 4, wherein the mixer searches for the joint data at a similar position by calculating a joint position region prior to mixing the joint data and mixes the searched joint data to solve a problem that the joint data at different part are mixed which is caused when the plurality of sensor apparatuses do not divide a heading direction of the user.

7. The system of claim 1, wherein the comparator calculates the pose vectors at a local coordinate at which even a position displacement of an upper joint does not affect a lower joint.

8. The system of claim 7, wherein the comparator calculates directions and lengths of the pose vectors at the local coordinate and determines a similar motion or a wrong motion based on a difference in the directions and the lengths.

9. A method for motion evaluation performed by an analysis apparatus using a plurality of sensor apparatuses, comprising:
receiving user's joint data acquired by photographing a user from the plurality of sensor apparatuses;
performing calibration on a plurality of joint data input from the plurality of sensor apparatuses;
performing synchronization on the plurality of joint data;
generating a user's skeleton by mixing the plurality of joint data into one joint data;
outputting a user character moved depending on a user's motion by using the skeleton, together with an expert character;
comparing a user's pose with an expert's pose by using pose vectors calculated for each body part; and
outputting the comparison result,
wherein in the performing of the synchronization, the plurality of sensor apparatuses record time starting to capture and interpolate the joint data based on the fastest capture time to synchronize the joint data of the plurality of sensor apparatuses.

10. The method of claim 9, wherein in the performing of the calibration, a coordinate of one of the plurality of sensor apparatuses is set as a reference coordinate and a coordinate transformation matrix for transforming coordinates of the rest sensor apparatuses into the reference coordinate is calculated.

11. The method of claim 10, wherein in the performing of the calibration, the coordinate transformation matrix is used to transform coordinates of the joint data of the rest sensor apparatuses to unify the plurality of joint data into the reference coordinate.

12. The method of claim 9, wherein in the performing of the synchronization, the plurality of sensor apparatuses applies a spline interpolation which is curved lines connecting between control points adjusted depending on a synchronization time for joint position values captured at a present time and a previous time to calculate a new joint position value.

13. The method of claim 9, wherein in the generating of the skeleton, the plurality of sensor apparatuses generate candidate segments depending on the number of joints tracked by the plurality of sensor apparatuses and included in a segment, select a segment having a highest tracking weight value from the candidate segments, and mix the joint data of the selected segment to generate the skeleton for the user's motion.

14. The method of claim 13, wherein in the generating of the skeleton, a body is divided into at least one segment among a body, both arms, and both legs, tracking frequencies of the plurality of sensor apparatuses for each joint are counted, segments in which all the included joints are tracked are determined as candidate segments, tracking weight values of each joint are allocated to correspond to the tracking frequencies, and a segment having the highest tracking weight values is selected from the candidate segments.

15. The method of claim 13, wherein in the generating of the skeleton, when there is no segment in which all the included joints are tracked, the joint is selected depending on the tracking weight values of each joint and the selected joint forms one segment.

16. The method of claim 13, wherein in the generating of the skeleton, the joint data at a similar position are searched by calculating a joint position region prior to mixing the joint data and the searched joint data are mixed to solve a problem that the joint data at different part are mixed which is caused when the plurality of sensor apparatuses do not divide a heading direction of the user.

17. The method of claim 9, wherein in the comparing of the user's pose with the expert's pose, the pose vectors calculated for each body part are defined and the pose vectors are used to compare the user's pose and the expert's pose having different body proportions with each other.

18. The method of claim 17, wherein in the comparing of the user's pose with the expert's pose, the pose vectors are calculated at a local coordinate at which even a position displacement of an upper joint does not affect a lower joint.

* * * * *